Aug. 22, 1933.                A. B. AVILLA ET AL                1,923,606
                                    HAY RAKE
                              Filed Nov. 18, 1932            2 Sheets-Sheet 1

Inventors
Anthony B. Avilla &
Joseph B. Avilla.

By
Attorneys

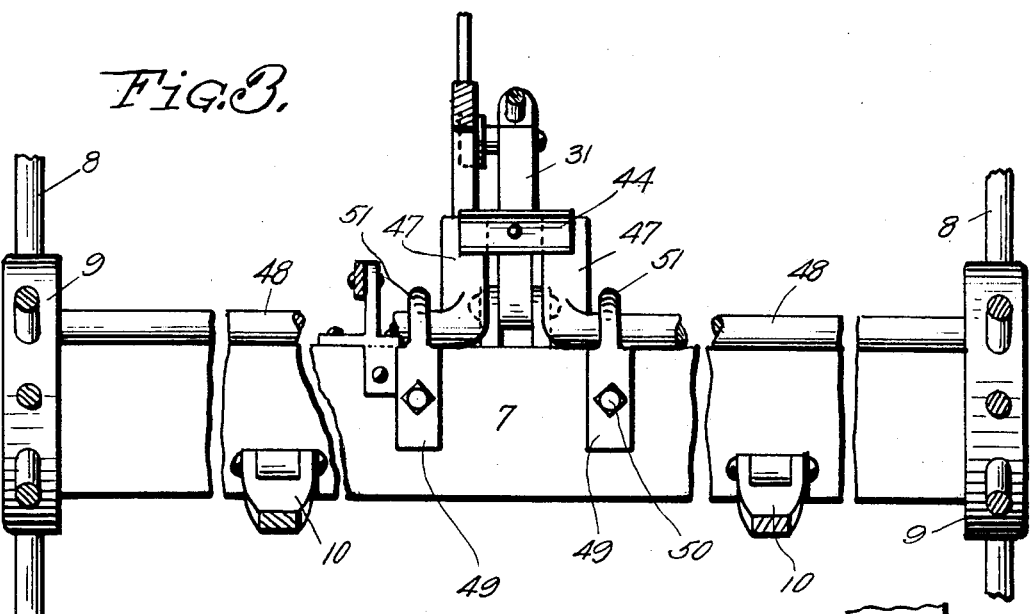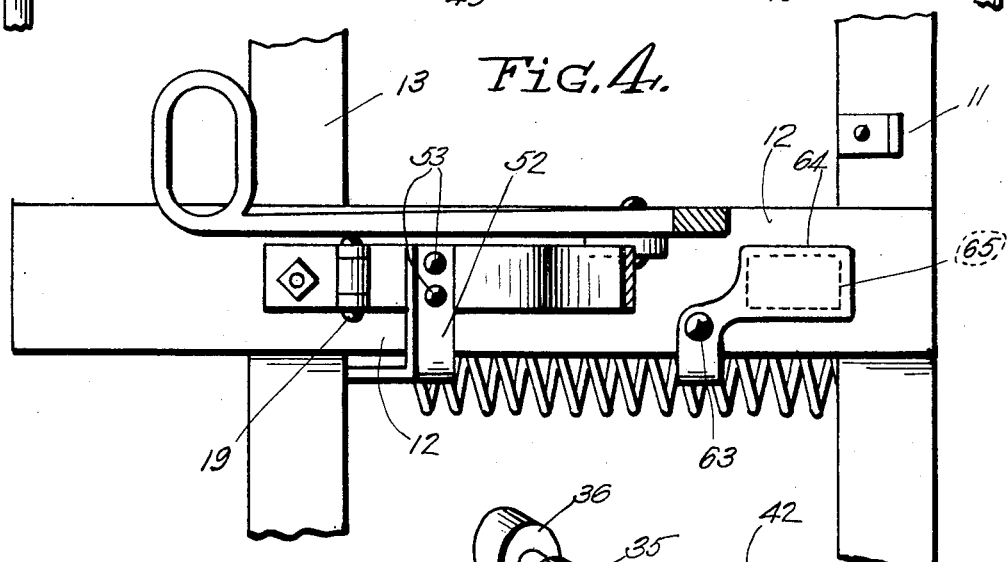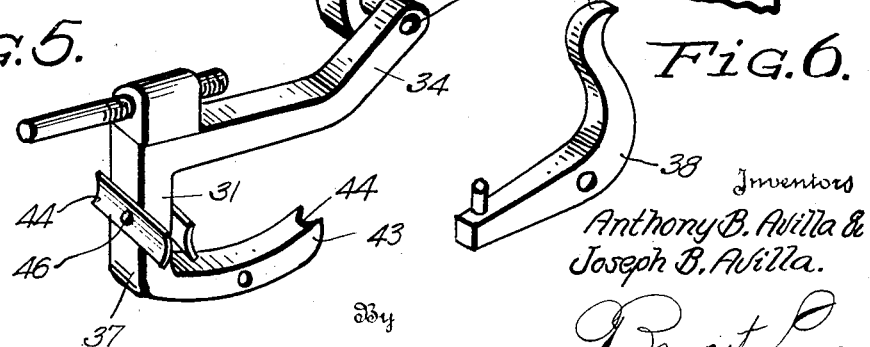

Patented Aug. 22, 1933

1,923,606

UNITED STATES PATENT OFFICE 1,923,606

HAY RAKE

Anthony B. Avilla and Joseph B. Avilla, Woodland, Calif.

Application November 18, 1932
Serial No. 643,280

11 Claims. (Cl. 56—378)

This invention relates to certain new and useful improvements in hay rakes and the invention comprises automatic means controllable by the absence of the driver from the seat of the hay rake which effects the raising of the rake, which in structures of this type are pivotally carried by the wheeled frame.

The invention further comprises a brake adapt to be set should the driver or operator of the hay rake for any reason whatsoever leave his position on the driver's seat thereby causing the rake to be locked against forward movement during the absence of the driver from his position.

Heretofore, numerous casualties have resulted in connection with hay rakes of the wheeled horse drawn type where the horses become disturbed and out of control of the driver. In such instances, the driver is frequently thrown from his seat in front of the hay rake while it is in its hay engaging position and such driver is badly hurt by either being engaged by the prongs of the hay rake or being dragged along the ground for a considerable distance.

The above objections and disadvantages are overcome by providing a hay rake adapted to be pivotally moved out of the way of a driver should he fall in front of the hay rake and said means comprises a connection between the seat and hay rake tripping lever in combination with brake rods adapted to operate brakes of the wheels when the driver is thrown from his seat thereby causing the hay rake tripping lever to be operated and the brake simultaneously set to prevent forward movement of the hay rake.

Other objects and advantages of the invention will become apparent during the course of the following description and in which, Figure 1 is a vertical cross-sectional view of a wheeled frame hay rake embodying this invention, illustrating the hay rake in its operative position and showing the seat in a position when an operator is positioned thereon;

Figure 3 is a front elevational view partly in section taken on line 3—3 of Figure 1, looking in the direction of the arrows illustrating the operating rods and the trip levers connected to the ends thereof adapted to be operated by the fingers on the hay rake engaging lever;

Figure 4 is a horizontal cross-sectional view taken on line 4—4 of Figure 1 looking in the direction of the arrows, illustrating a portion of the frame and manner in which the lower end of the seat spring is pivoted thereto and is further tensioned by means of a coil spring;

Figure 5 is a perspective view of the brake rod operating mechanism and pivoted lever for setting the brake; and Figure 6 is a perspective view of the lever adapted to engage the hay rake raising lever and brake rod operating lever.

Figure 1:
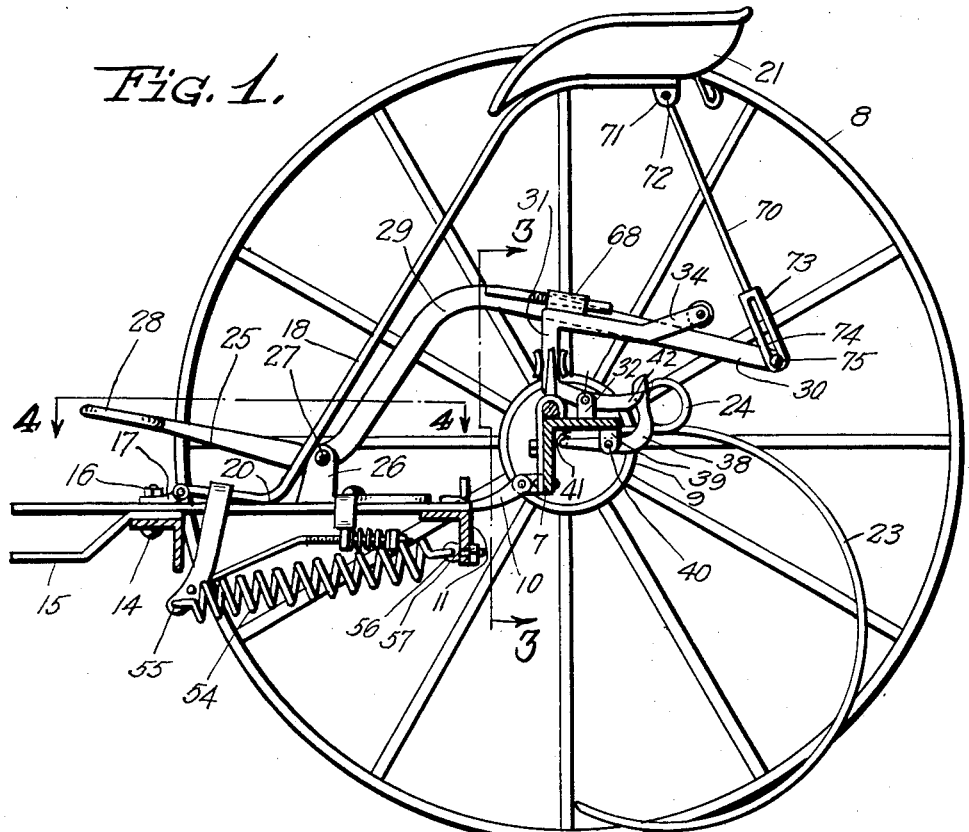

In the drawings, wherein for the purpose of illustrating the invention and wherein like reference characters will be employed to designate like parts throughout the same, the reference character 7 will generally be employed to designate a wheeled frame member angular in cross-section and the ends of which are provided with bearings so that the frame may be supported from the ground by wheels 8 having hubs 9 in the usual manner.

Hingedly secured to the forward portion of the angular frame 7 by means of a pair of hinged arms 10 is a draft bar 11 which is also angular in cross-section and extends parallel to the angle bar frame 7. Secured to the draft bar 11 is a tongue frame 12 having a cross-bar 13 held in place by a bolt 14. Interposed between the tongue frame bar 12 and the cross-bar 13 is a tongue engaging bar 15 positioned relative to the forward end of the tongue frame 12 so as to allow a tongue to be bolted therebetween.

Also secured to the bolt 14 and held in place by a nut 16 is a plate 17 to which is hinged the lower end of a seat leaf spring 18 by means of a pintle. The seat leaf spring 18 engages the tongue bar 12 as at 20 while a saddle 21 is bolted to the upper end for accommodating an operator.

A series of curved rake bars 23 have their inner ends coiled as at 24 and are secured to the underside of the angle bar frame 7 in a conventional manner so that tilting of the angle bar frame 7 about the axes of the hubs of the wheel 9 raises and lowers the rake teeth 23 from and to the surface of the ground. Means is provided for tripping the rake teeth 23 and comprises a foot operated lever 25 pivotally mounted between vertically extending ears 26 secured to the tongue engaging bar 12 as clearly shown in Figure 1. The lever 25 is adapted to rock on the fulcrum 27 and is provided with a foot engaging portion 28 within easy reach of the driver when upon the seat 21. The opposite end of the lever 25 is provided with an angular portion 29 terminating in a straight portion 30 which is substantially parallel to the foot engaging portion 28. The straight portion 30 of the lifting lever 25 is adapted to be engaged by a U-shaped lever 31 pivoted to the angle bar frame 7 by means of a pair of upstanding ears 32 and a pivot pin 33. The U-shaped lever 31 is provided with an angle portion 34 having a pin 35 extending therefrom laterally upon which is rotatably mounted a roller 36. The roller 36 engages the straight portion 30 of the manual operating lever 25 to effect the tilting of the angle frame 7 and snaps downwardly after reaching the angular portion 29 as is shown in Figure 2. Pivotally attached to the angle bar frame 7 is a catch lever 38 pivotally mounted between a pair of ears 39 and having one end engaged by a coil spring 41 to normally press the opposite end of the latch lever 38 as at 42 into engagement with the free end of the U-shaped lever 43 kerfed as at 44 for being guided by the end 42 of the lever 38. Mounted transversely on the upright portion of the U-shaped lever 31 is a pair of brake rod engaging plates 44 extending laterally on both sides of the U-shaped lever and held in place by means of a pin or bolt 46. The brake rod engaging ears 44 are curved in cross-section to provide contacting faces for engaging the vertically extending angle portions 47 formed on the inner ends of the brake operating rods 48 which are journalled on the angle bar frame by means of plates 49 bolted thereto as at 50 and having curved upper ends adapted to encircle the brake operating rods 48. It will be readily understood that the vertical movement of the lever 25 will effect the tilting of the U-shaped lever 31 by locking the angle frame bar 7 to the wheel hubs 9 after the brake engaging ears 44 have engaged the vertical portion 47 of the brake rod 48 and set the brakes mounted within the hubs 9 of the wheels 8. The brakes may be of the usual form and are not considered a part of the invention.

Means is provided for normally holding the seat 21 in an upward direction and comprises an angle bracket 52 secured to the seat leaf spring 18 by means of rivets 53 so that the free end of the angle bracket may extend downwardly and forwardly for receiving one end of the coil spring 54 as at 55. The rear end of the coil spring 54 is connected to the draw bar 11 by means of an I-bolt 56 held in place by a suitable nut 57. Pivotally secured to the angle bracket 52 is a rearwardly extending rod 58 having secured to the rear end thereof by means of a nut 59 a coil spring 60 so that the opposite end of the coil spring may engage a downwardly extending lug 61 formed on the lower portion of the pivoted angle bar 62 which is pivoted to the tongue frame 12 as at 63. The opposite end of the pivoted angle bar 62 is provided with an enlarged portion 64 rectangular in shape and adapted to cover an opening 65 formed in the tongue frame 12, for receiving an adjustable rod 66 having screw threads 67 for being adjusted in a correspondingly screw threaded boss 68 formed on the U-shaped lever 31. The purpose of the rod 66 to limit the movement of the U-shaped lever 31 when the brake rods have been operated manually thereby causing slippage between the wheels and angle bar frame 7 by partially releasing the brakes. It is to be understood that the outer ends of the brake rods 48 are provided with angle portions adapted to engage teeth formed interiorly of the hubs 9. The construction is present in conventional hay rakes, as shown in Patent No. 1,812,035 granted to O. F. Carlson, June 30, 1931.

The automatic means for raising the rake teeth 23 comprises a link 70 having one of its ends pivotally secured between a pair of ears 71 formed on the upper end of the seat leaf spring 18 as at 72 while the lower end of the link 70 is provided with an enlarged portion 73 having an elongated slot 74 for receiving a pin 75 carried by the extreme free end of the lever 25 at its straight portion 30.

Figure 2:
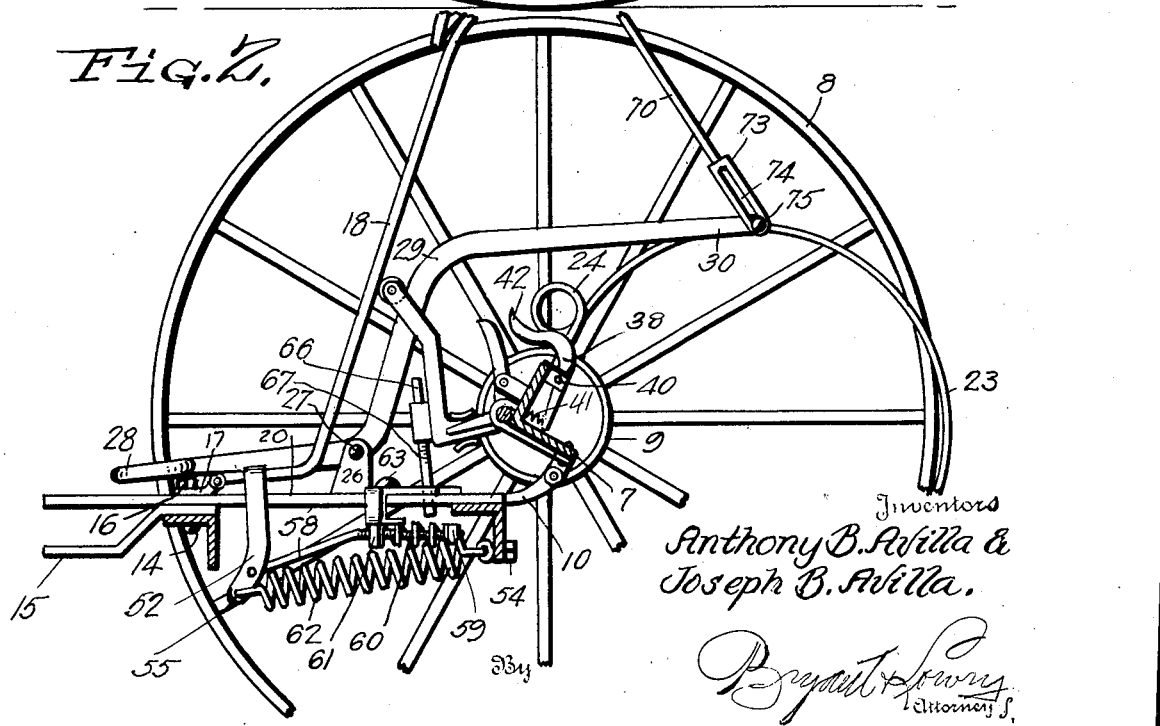
Figure 2 is a vertical cross-sectional view of the hay rake and its associated parts embodying this invention illustrating the hay rake in its raised position and showing the seat in a position when the driver is absent therefrom.

For a consideration of the operation of the invention, it will be assumed that the hay rake is being employed and is being drawn by horses and the driver or operator is sitting upon the seat 21 whereupon the parts of the hay rake will be in the position shown in Figure 1. It will now be assumed that the horses become out of the control of the driver and during such uncontrol, the driver is thrown from his seat 21 in front of the hay rake or draft frames 11 and 13. As soon as the driver has left the seat by accident or any other reason, the leaf spring 18 is forced upwardly about its pivot point 19 due to the action of the coil spring 54 which vertical movement causes the link 70 to engage the pin 75 and thereby tilt the tripping lever 25 on its fulcrum or pivot point 27. This movement causes the tilting of the U-shaped lever 31 by reason of the roller 36 engaging the straight portion 30 of the operating lever until the U-shaped lever has been rocked so that the ears 44 engage the projections 47 of the brake rods 48 on the angle frame bar 7 and causes the locking of the wheels 8 with the angle bar 7. The rotary motion of the wheels rotates the angle frame bar 7 to a tilting position.

After the brake rods 48 have been moved to lock the angle bar frame 7 with the wheels, the adjustable screw threaded rod 66 will move with the frame bar 7 into the opening 65 by reason of the fact that the vertical movement of the seat 21 will have caused the movement of the extension 52 and operate the rod 58 to swing the closure plate 64 to a position out of the path of the rod 66. The angle frame bar 7 will move to a maximum position before the U-shape lever 31 finally engages a portion of the draft frame 12 which engagement will allow slippage between the wheel hubs 9 and outer ends of the brake rods 48.

Under normal conditions, when the driver wishes to raise the rake teeth he operates the lever 25 which locks the hubs 9 to the angle bar frame 7 thereby raising the hay rake teeth 23 but the adjustable rod 66 limits the rotary movement of the angle frame bar 7 so that the rake teeth and angle frame bar will be released from engagement with the wheel hubs 9. The rake teeth can only be raised to their limit when the plate 64 has moved away from the opening 65 in the frame tongue 12 to allow the extreme downward movement and forward tilting of the U-shaped lever 31. As stated above, when the operator depresses the foot engaging portion 28 of the lever 25 manually the screw threaded rod 66 will engage the plate 64 and prevent the maximum movement of the U-shaped lever 31 so that the ears 44 will engage the extensions 47 and release the ends of the rods 48 from engagement with the toothed inner periphery of the hubs 9.

It is to be noted, that the elongated slot 74 is formed in the enlarged end 73 of the link 70 so that the seat 21 may reciprocate when the driver is thereon and the manual operating lever 29 will not be operated due to the lost motion effected by the slot 74 and pin 75.

It is to be understood that the form of the invention herewith shown and described may be taken as a preferred embodiment of the same and that various changes in the shape, size and arrangement of parts may be resorted to without departing from the spirit and scope of the invention as claimed.

We claim:—

1. A hay rake of the character described, comprising a wheeled frame, a series of rake teeth carried by the wheeled frame, means for tilting the wheeled frame and raising the rake teeth, and means operable by the weight of the driver on the operator's seat of the hay rake for holding the rake in its ground engaging position.

2. A hay rake of the character described, comprising a wheeled frame, a spring seat carried by the wheeled frame, a series of rake teeth carried by the wheeled frame, and means operable upon the absence of the driver from the seat for raising the hay rake teeth from engagement with the ground.

3. A hay rake of the character described, comprising a wheeled frame, a driver's seat resiliently supported on the wheeled frame, a series of rake teeth carried by the wheeled frame, means controllable from the driver's seat to effect raising the rake teeth out of engagement with the ground and means operable by the absence of the driver from the driver's seat for automatically raising the rake teeth from engagement with the ground.

4. A hay rake of the character described, comprising a wheeled frame adapted to be tilted on its axis, a series of rake teeth secured to the wheeled frame, a draft bar hinged to the wheeled frame, a driver's seat supported by the draft bar adapted to move vertically, and means controllable by the vertical movement of the driver's seat for raising the rake teeth from engagement with the ground.

5. A hay rake of the character described, comprising a wheeled frame, a series of rake teeth carried by the wheeled frame, a driver's seat mounted on the wheeled frame adapted to move up and down and means controllable by the vertical movement of the driver's seat to raise the rake teeth from engagement with the ground.

6. A hay rake of the character described comprising a wheeled frame, a series of rake teeth carried by the wheeled frame, a driver's seat supported on the wheeled frame adapted for vertical movement, means operable from the driver's seat for tilting the wheeled frame to cause the rake teeth to move out of engagement with the ground and means operable independent of the first mentioned means by the vertical movement of the driver's seat for raising the rake teeth in case of emergency.

7. A hay rake of the character described, comprising a wheeled frame, rake teeth carried by the wheeled frame, a leaf spring carried by the wheeled frame, a driver's seat mounted on the free end of the leaf spring, means controllable from the driver's seat for tilting the wheeled frame and raising the rake teeth, and means operable by the vertical movement of the driver's seat for tilting the wheeled frame and raising the rake teeth independent of the manual operation means.

8. A hay rake of the character described comprising a wheeled frame, rake teeth carried by the wheeled frame adapted to be raised and lowered relative to the ground by tilting of the wheeled frame, a driver's seat supported on the wheeled frame for vertical movement and means operable by the vertical movement of the seat for tilting the wheeled frame.

9. A hay rake of the character described comprising a wheeled frame adapted to be tilted on its axis, a series of rake teeth carried by the wheeled frame, a driver's seat supported on the wheeled frame for vertical movement, means operable by the vertical movement of the driver's seat for tilting the portion of the wheeled frame upon which the rake teeth are carried thereby raising the teeth from engagement with the ground and said means comprising brakes carried by the wheeled frame adapted to be set upon the vertical movement of the driver's seat.

10. A hay rake of the character described, comprising a wheeled frame adapted to be tilted on its axis, a series of rake teeth carried by the wheeled frame adapted to move with the wheeled frame, brakes carried by the wheeled frame, a driver's seat supported for vertical movement on the draft bar of the wheeled frame, a foot operated lever pivoted to the draft bar, means connecting the foot lever to the wheeled frame whereby operation of the foot lever will effect the tilting of the wheeled frame to raise the rake teeth from the ground, said means also acting to set the brakes of the wheels, and a link having one end connected to the driver's seat and its opposite end having a lost motion connection with the foot lever whereby vertical movement of the driver's seat will raise the rake teeth from the ground and simultaneously set the brakes on the wheels.

11. A hay rake of the character described comprising a wheeled frame adapted to be tilted on its axis, a series of rake teeth extending downwardly from the wheele frame, draft bars hinged to the wheeled frame to swing in a vertical plane, a driver's seat supported on one of the draft bars adapted for vertical movement, a foot operated lever carried by the same draft bar, an angle portion formed on the lever extending rearwardly, an angle lever carried by the wheeled frame adapted to be operated by the angle portion of the foot operated lever for tilting the wheeled frame and raising the rake teeth relative to the ground, ears formed on the angular lever of the wheeled frame, brake rods having angle portions adapted to be engaged by the ears, brakes carried by the wheeled frame, operated by the brake rods, and a link having a lost motion connection with the seat, and said foot operated lever adapted to raise the rake teeth and set the brakes when the driver's seat is raised vertically by his absence therefrom.

ANTHONY B. AVILLA.
JOSEPH B. AVILLA.